United States Patent [19]
Kurokawa

[11] Patent Number: 5,929,930
[45] Date of Patent: *Jul. 27, 1999

[54] IMAGE PROCESSING APPARATUS AND METHOD

[75] Inventor: Kuniaki Kurokawa, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/497,054

[22] Filed: Jun. 30, 1995

[30] Foreign Application Priority Data

Jul. 5, 1994 [JP] Japan .................................. 6-153905
Jul. 5, 1994 [JP] Japan .................................. 6-153906

[51] Int. Cl.⁶ .................................................. G06K 9/36
[52] U.S. Cl. ......................... 348/568; 382/232; 348/584
[58] Field of Search .................................. 348/430, 412, 348/413, 400, 401–407, 416, 415, 409, 568, 418, 584, 556, 558, 419; 382/232, 233, 234, 235, 236, 243, 251, 239, 419, 253, 284, 285, 318; 364/514 R

[56] References Cited

U.S. PATENT DOCUMENTS

| | | | |
|---|---|---|---|
| 5,204,740 | 4/1993 | Ishii | 358/133 |
| 5,333,212 | 7/1994 | Ligtenberg | 348/418 |
| 5,357,281 | 10/1994 | Ikeda et al. | 348/401 |
| 5,374,958 | 12/1994 | Yanagihara | 348/405 |
| 5,382,283 | 1/1995 | Yui et al. | 106/31.58 |
| 5,461,682 | 10/1995 | Nomura | 382/232 |
| 5,502,778 | 3/1996 | Ishikawa et al. | 382/239 |
| 5,504,533 | 4/1996 | Ito et al. | 348/511 |
| 5,543,845 | 8/1996 | Asamura et al. | 348/407 |
| 5,774,589 | 6/1998 | Aritake et al. | 382/232 |

FOREIGN PATENT DOCUMENTS

| | | |
|---|---|---|
| 0 250 271 | 12/1987 | European Pat. Off. . |
| 0 592 774 | 4/1994 | European Pat. Off. . |
| 0173592 | 8/1985 | Japan . |
| 0024787 | 2/1987 | Japan . |
| 0232691 | 9/1988 | Japan . |
| 0051785 | 2/1989 | Japan . |
| 0016490 | 1/1991 | Japan . |
| 0066281 | 3/1991 | Japan . |

Primary Examiner—Douglas W. Olms
Assistant Examiner—Seema S. Rao
Attorney, Agent, or Firm—Fitzpatrick, Cella, Harper & Scinto

[57] ABSTRACT

A method of the invention includes inputting at least two or more image signals, and superimposing at least two or more image signals among the plurality of image signals as a child screen on the same screen. In doing so, image compression ratio is controlled using coordinates information of the child screen region superimposed. That is, the compression ratio of the child region is made different from that in the other image regions to have an appropriate image compression ratio of the child screen superimposed.

64 Claims, 15 Drawing Sheets

IMAGE PROCESSING APPARATUS AND METHOD

BACKGROUND OF THE INVENTION

1. Field of the Invention

The present invention relates to an image processing apparatus and method for compressing a multi-image composed of a plurality of images superimposed on the same screen to transmit it via a circuit network.

2. Related Background Art

Conventionally, image processing apparatuses have been known which compress a multi-image composed of a plurality of images superimposed on the same screen to transmit it via a circuit network. Conventional image processing apparatuses were configured as shown in a block diagram as shown in FIG. 13.

In FIG. 13, 101 is a first image signal input device for inputting the image, comprised of, for example, a video camera, 102 is a first voice signal input device for inputting the voice, comprised of, for example, a microphone. 103 is a second image signal input device, comprised of, for example, a still video camera. 104 is a second voice signal input device, comprised of a microphone, like the voice signal input device 102.

105 is an image signal switching unit, comprised of switches, for switching, based on a control signal from a system control unit 608, which of two image signals input from the first image signal input device 101 and the second image signal input device 103 is made a child screen.

106 is an image signal processing unit, comprised of a field memory and a synchronizing signal separation circuit, for implementing a so-called picture-in-picture function of superimposing one of two input image signals as a child screen on the same screen. 106 will be described later using FIG. 3.

607 is an image compression unit, comprised of a discrete cosine conversion circuit, a between-frame comparison circuit, and a quantizing circuit, for reducing the data amount of image signal by removing a redundant signal component contained in an image signal output from the image processing unit 606.

608 is a system control unit for controlling the entire image processing apparatus, comprised of a CPU, a ROM and a RAM. 109 is a voice addition unit, comprised of a resistor and an amplification circuit, for adding or synthesizing voice signals input respectively from the first voice signal input device 102 and the second voice signal input device 104. 110 is a voice signal processing unit, comprised of an A/D converter and a memory, for quantizing a voice signal added by the voice addition unit 109.

111 is a signal multiplexing unit, comprised of a data latch circuit and a parallel/serial conversion circuit, for multiplexing a compressed and quantized image signal output from the image compression unit 607, and a quantized voice signal output from the voice processing unit 110 to generate packet data for the data communication.

112 is a circuit network control unit (line network control unit), comprised of a relay circuit and a transformer circuit, for making network connection or disconnection with or from other terminal equipments via the circuit network. 113 is a line terminal unit for connecting this image processing apparatus with the circuit network using a modular connector. 114 is an operation panel unit comprised of switches for operating the image processing apparatus of this conventional example.

Next, the overall operation of the image processing apparatus configured in this way will be described.

First, the image signals input respectively from the first image signal input device 101 and the second image signal input device 103 are input via the image signal switching unit 105 into the image signal processing unit 606.

Then, upon receiving a control signal from the system control unit 108, when a switch of the image signal switching unit 105 is at the first terminal a side, a multi-image is formed in the image signal processing unit 606 with an image signal from the first image signal input device 101 as a parent screen, which multi-image is then output to the image compression unit 607. Also, when it is at the second terminal b side, a multi-image is formed with an image signal from the second image signal input device 103 as a parent screen, which multi-image is then output to the image compression unit 607.

Next, a multi-image signal composed of two image signals output from the image signal processing unit 606 superimposed is compressed by subjecting image difference between frames to discrete cosine conversion in the image compression unit 607, then quantized after the image compression, and output to the signal multiplexing unit 111 as discrete digital image data.

On the other hand, the voice signals input from the first voice signal input device 102 and the second voice signal input device 104 are added and synthesized in the voice addition unit 109. And the added and synthesized voice signal is supplied to the voice signal processing unit 110 to be formed into discrete digital voice data, and output to the signal multiplexing unit 111.

The signal multiplexing unit 111 incorporates these digital image data and digital voice data into packet data for use in the data communication, and then outputs it to the circuit network control unit 112. The circuit network control unit 112 transmits image data and voice data to a remote terminal equipment via the circuit network. In this way, the image data and voice data are transmitted to the remote terminal equipment.

However, in the conventional image processing apparatus, because a multi-image superimposed in the image signal processing unit 106 is compressed, the following inconveniences have been often encountered.

That is, for example, if one of two image signals is an animated image signal, and the other image signal is a still image signal in which a high resolution image such as a document is photographed, there is a problem that the character written on the document becomes obscure due to quantization error in image compression, if the compression ratio of image signal is raised.

Also, in the conventional apparatus, because the switching between an in-frame compression mode and a between-frame compression mode occurred in the image compression at the preset N-th frame, the between-frame image compression would occur, even when the correlation of image between the previous frame and the current frame was weak, for example, when the child screen was moved halfway during image compression of multi-image signal, resulting in a problem that the image quality was degraded or the image compressed data amount increased rapidly.

SUMMARY OF THE INVENTION

It is an object of the present invention to provide an image processing apparatus and method which can resolve the aforementioned problems.

It is another object of the invention to provide an image processing apparatus and method capable of setting an image compression ratio suitable for the kind of respective images superimposed on the same screen.

It is a further object of the invention to provide an image processing apparatus and method having less occurrence of image degradation even when the display mode of child screen superimposed on the same screen is changed.

To accomplish the above objects, according to a preferred embodiment of the present invention, there is provided an image processing apparatus comprising, image input means for inputting at least two kinds of images, synthesizing means for synthesizing said input images, compression means for compressing an image synthesized by the synthesizing means, and control means for controlling the compression ratio of the compression means in accordance with the kind of the image.

Also, it is a yet further object of the invention to provide an image processing apparatus and method having new functions.

Other objects and features of the present invention will be more apparent from the following drawings and the detailed description of the invention.

DETAILED DESCRIPTION OF THE PREFERRED EMBODIMENTS

One example of an image processing apparatus according to the present invention will be described below with reference to the drawings.

Figure 1:
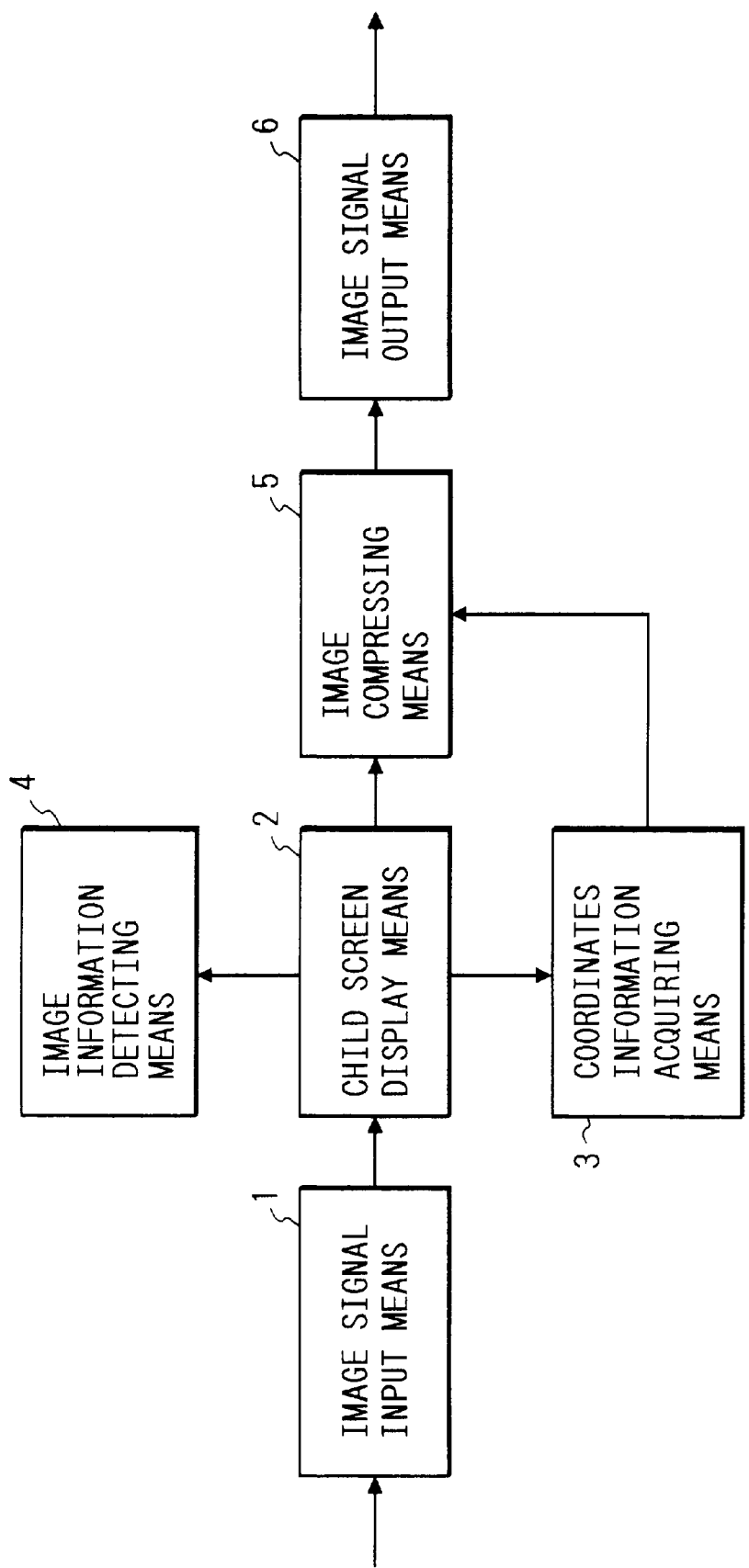
FIG. 1 is a functional configuration diagram showing one example of an image processing apparatus according to a first embodiment.

FIG. 1 is a functional block diagram showing the schematic functional configuration of the image processing apparatus according to the present invention.

In FIG. 1, 1 is image signal input means, 2 is child screen display means, 3 is coordinates information acquiring means, 4 is image information detecting means, 5 is image compression means, and 6 is image signal output means.

Among these means, the image signal input means 1 is provided to input at least two or more image signals, and comprised of a plurality of image input devices, as will be described later.

Also, the child screen display means 2 has a function of displaying at least one image signal or more among a plurality of image signals input by the image signal input means 1, as a child screen superimposed on the same screen.

The coordinates information acquiring means 3 is provided to acquire the coordinates information of a child screen area superimposed by the child screen display means 2, and the image information detecting means 4 is provided to detect the movable size of the image displayed on each child screen which is superimposed on the same screen by the child screen display means 2.

The image compression means 5 is provided to compress the multi-image composed of a plurality of images superimposed on the same screen, wherein the compression ratio in compressing the multi-image is controlled, based on the coordinates information obtained by the coordinates information acquiring means 3 in this example.

The detail configuration of the image processing apparatus in the first example of the invention will be described below with reference to FIGS. 2 to 12.

Figure 2:
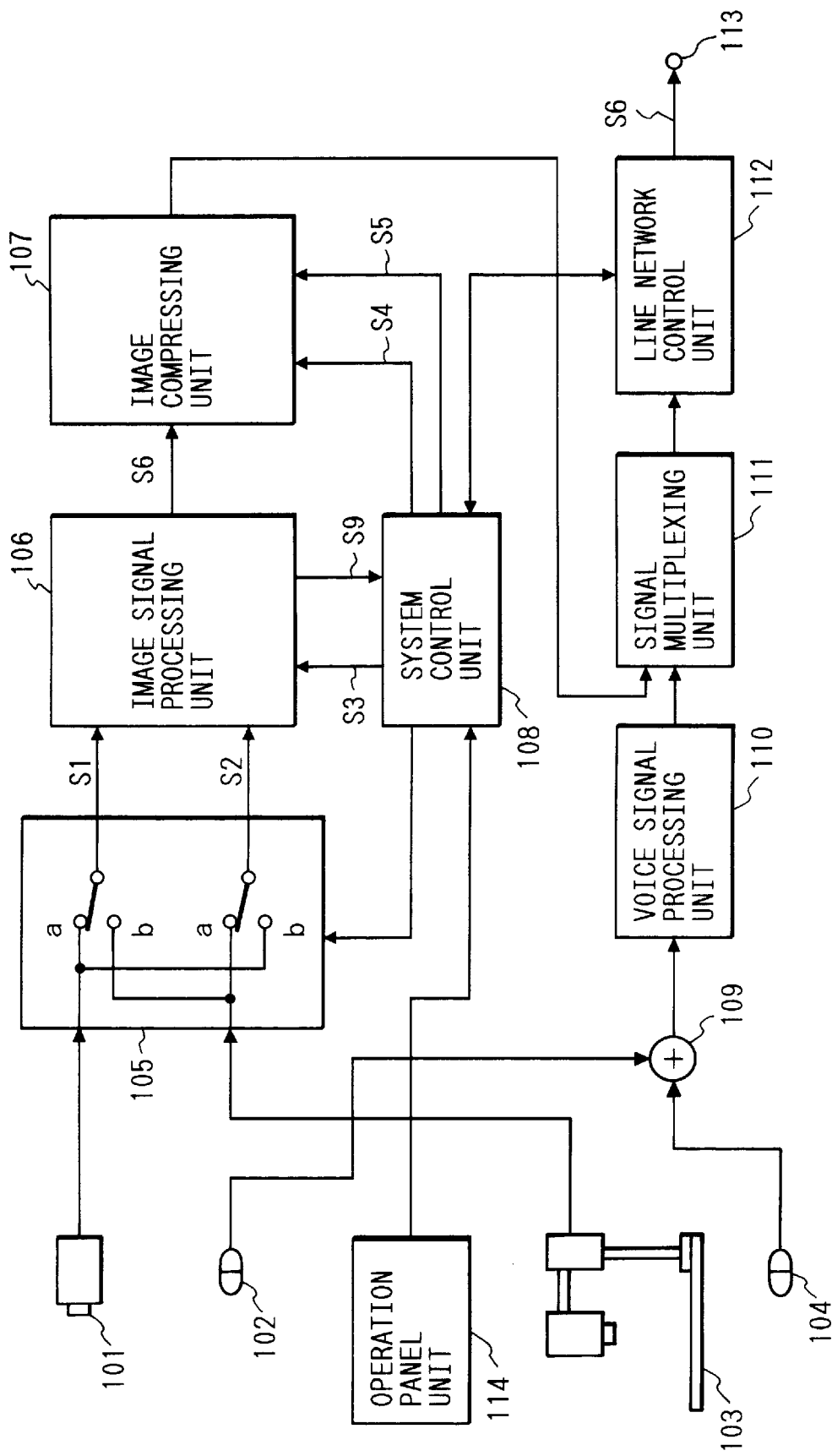
FIG. 2 is a system block diagram of the image processing apparatus according to the first embodiment.
Figure 3:
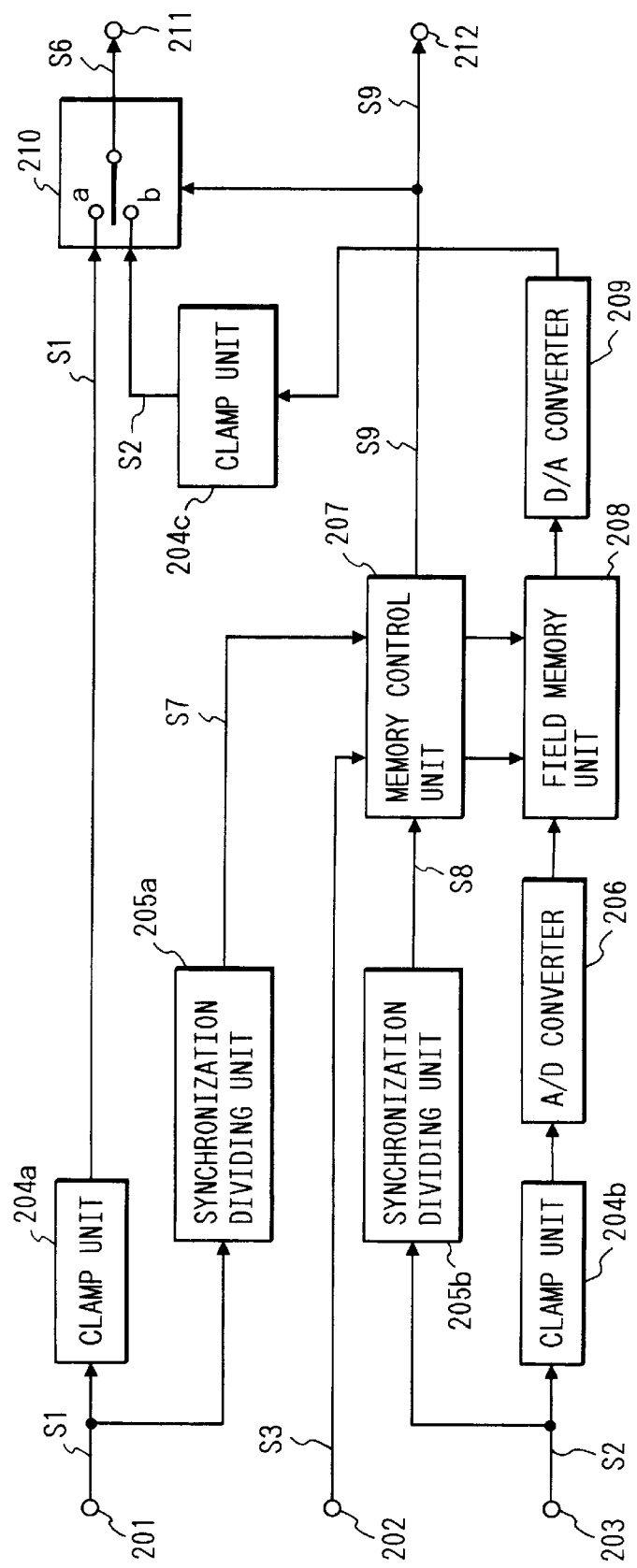
FIG. 3 is a block diagram showing the configuration of an image signal processing unit 106 as shown in FIG. 2.
Figure 4:
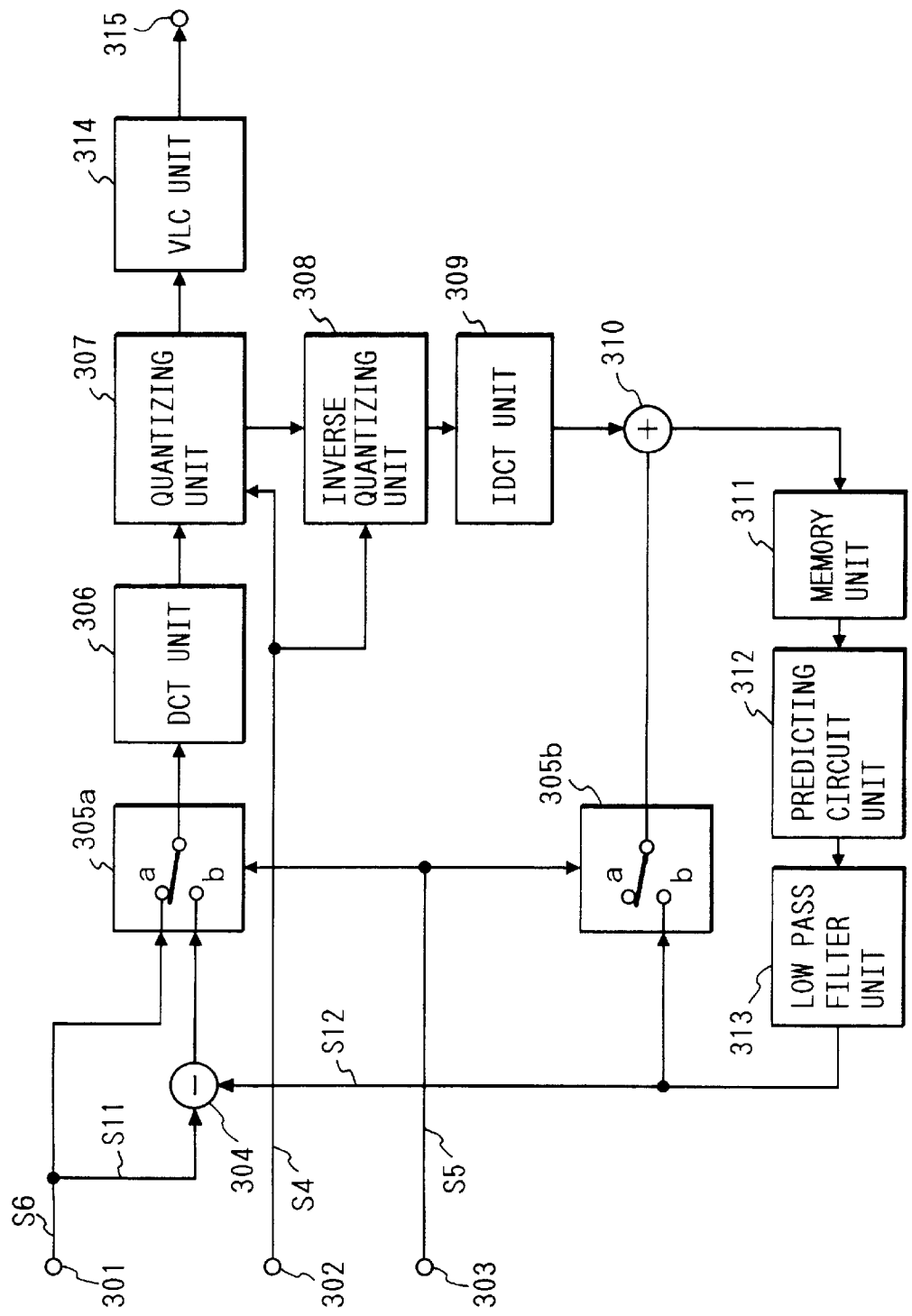
FIG. 4 is a block diagram showing the configuration of an image compression unit 107 as shown in FIG. 7.
Figure 5:
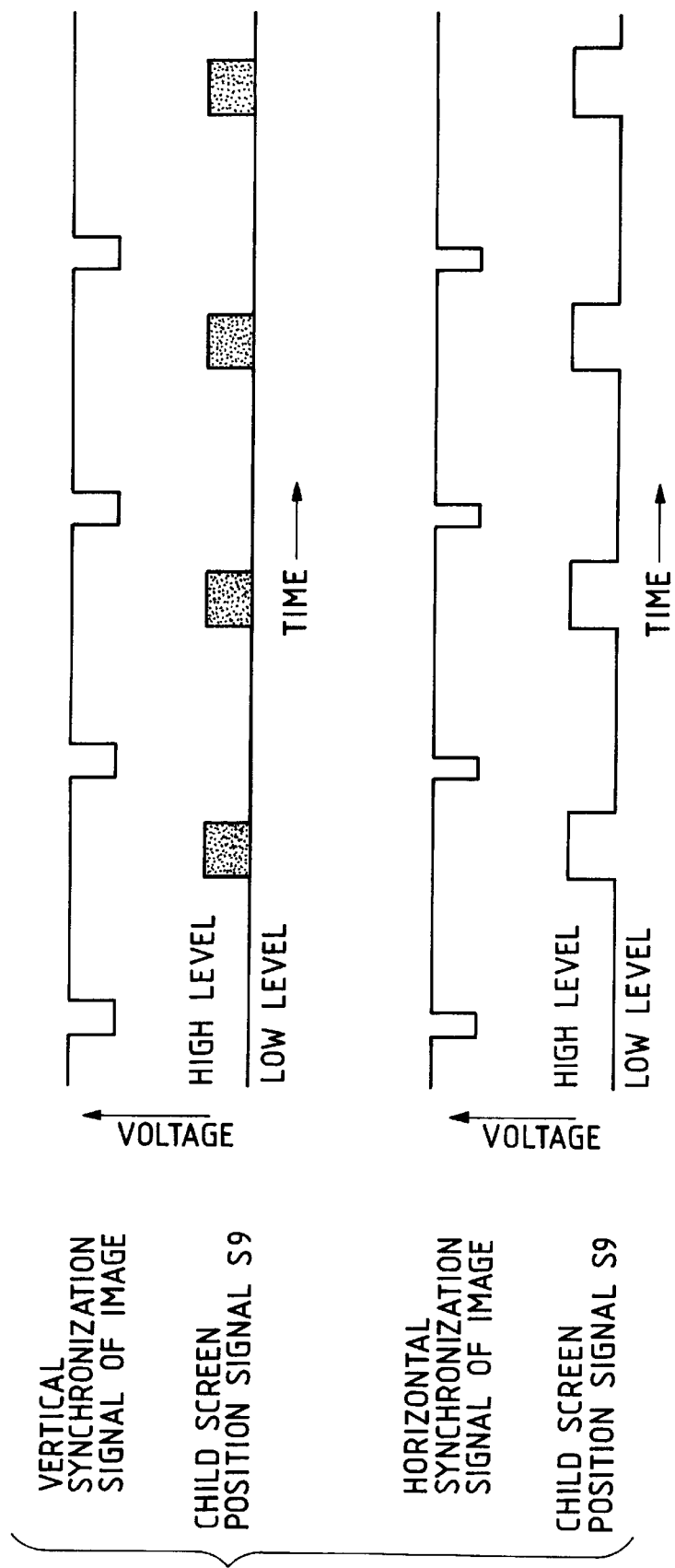
FIG. 5 is a timing chart for explaining a child screen position signal output from the image signal processing unit 106 as shown in FIG. 2.
Figure 6:
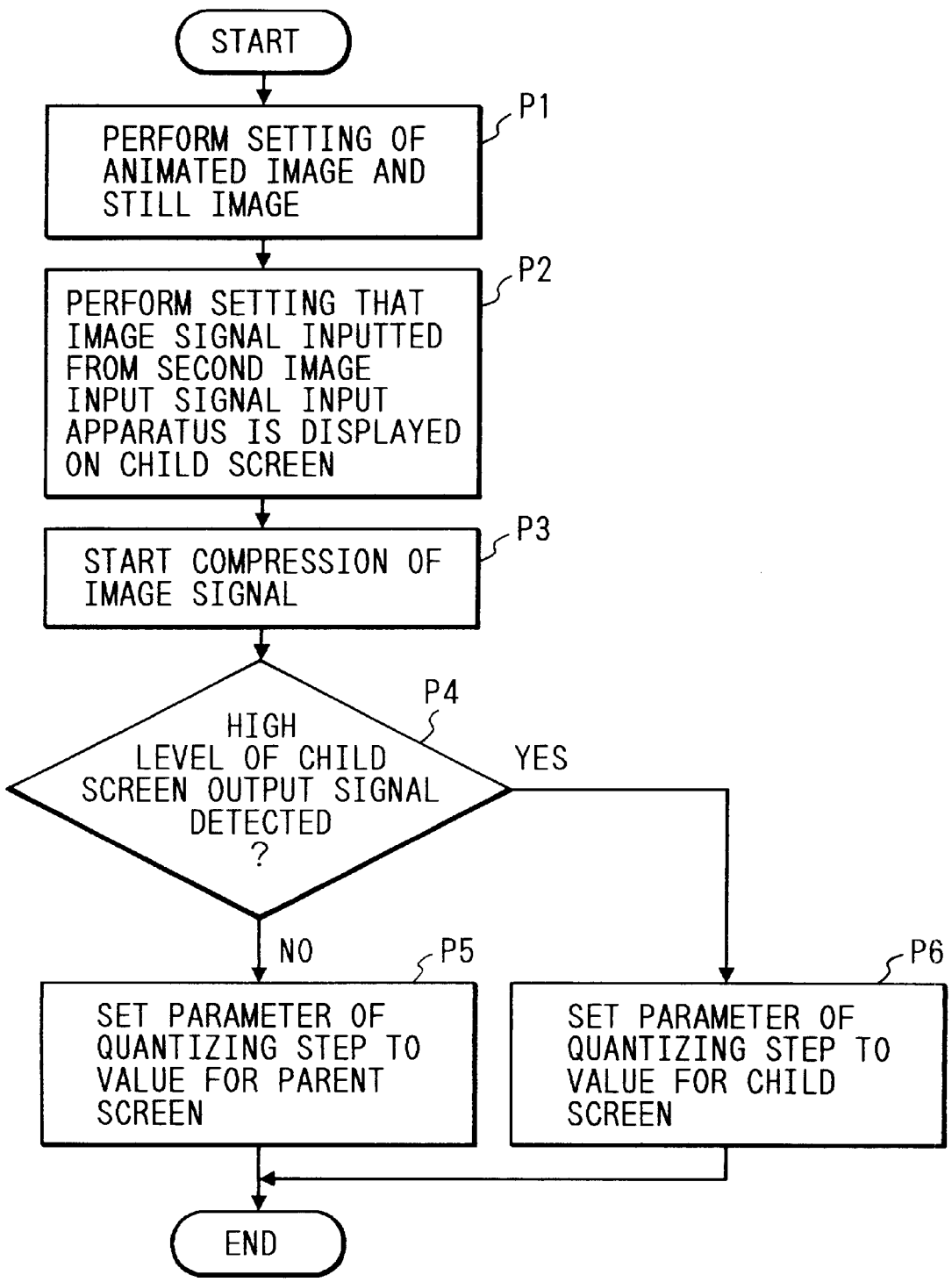
FIG. 6 is a flowchart showing an image compression operation sequence of the image processing apparatus according to the first embodiment.

FIG. 2 is a system block diagram best representing the image processing apparatus of the first example, FIG. 3 is a block diagram showing the configuration of an image signal processing unit 106 as shown in FIG. 2, FIG. 4 is a block diagram showing the configuration of an image compression unit 107 as shown in FIG. 2, FIG. 5 is a timing chart of a child screen position signal S9 output from the image signal processing unit 106 as shown in FIG. 2, and FIG. 6 is a flowchart showing an image compression operation sequence of the image processing apparatus of the first example. Note that like numerals are attached to like parts through FIGS. 2 to 6 and FIG. 13 of which explanation is omitted.

106 is an image signal processing unit for implementing a so-called picture-in-picture function of superimposing one of two input image signals as a child screen on the same screen, comprising a field memory and a synchronizing signal separation circuit.

107 is an image compression unit for reducing the data amount of image signal by removing a redundant signal component contained in an image signal S6 output from the image processing unit 106, comprising a discrete cosine conversion circuit, a between-frame comparison circuit, and a quantizing circuit, in which quantizing parameters can be changed by a control signal from the system control unit 108.

108 is a system control unit for controlling the entire image processing apparatus, comprised of a CPU, a ROM and a RAM. 109 is a voice addition unit, comprised of a resistor and an amplification circuit for adding and synthesizing voice signals input respectively from a first voice signal input device 102 and a second voice signal input device 104. 110 is a voice signal processing unit, comprised of an A/D converter and a memory, for quantizing a voice signal added by the voice addition unit 109. A quantizing step control signal S4 is output in accordance with the child screen display position information input from an operation panel 114.

111 is a signal multiplexing unit, comprised of a data latch circuit and a parallel/serial conversion circuit, for multiplexing a compressed and quantized image signal output from the image compression unit 107, and a quantized voice signal output from the voice processing unit 110 to generate packet data for the data communication.

112 is a circuit network control unit (line network control unit), comprised of a relay circuit and a transformer circuit, for making network connection or disconnection with or from other terminal equipment via the circuit network. 113 is a line terminal unit for connecting this multi-image transmission apparatus with the circuit network using a modular connector. 114 is an operation panel unit, comprised of switches for operating the multi-image signal input apparatus of this example, which indicates the child screen position.

Next, the configuration of the image signal processing unit 106 will be described in detail with reference to a block diagram of FIG. 3.

In FIG. 3, 201 is an input unit of a parent image signal S1 input into the image signal processing unit 106, 202 is an input unit of a child screen position control signal S3, which is input from the system control unit 108, for setting the counter value determining the superimposing position of the child screen in accordance with an instruction from the operation panel 114, and 203 is an input unit of a child screen signal input into the image signal processing unit 106.

204a to 204c are clamp units for reproducing the DC level in making A/D conversion or D/A conversion of image signal.

205a and 205b are synchronization dividing units, for dividing, from the image signals S1, S2, vertical and horizontal synchronization signals for use in the memory control of a field memory unit 208 used to generate an image signal S2 of child screen.

206 is an A/D converter for converting an image signal S2 of the child screen which is an analog signal into discrete digital image signal.

207 is memory control unit for controlling the writing and reading of the digital child screen image signal S2 into and from the field memory unit 208, in terms of a synchronization signal S7 of parent screen output from the synchronization dividing unit 205a, a synchronization signal S8 of the child screen output from the synchronization dividing unit 205b, and a child screen position control signal S3 from the system control unit 108, to enable a child screen of appropriate size to be output, and further outputting the image position at which the child screen is superimposed.

208 is a field memory unit for recording the image signal S2 of child screen which has been digitized.

209 is a D/A converter for converting the image signal S2 of the child screen digitized and recorded in the field memory unit 208 again into an analog image signal.

210 is an image switching unit for switching between an image signal S1 of the parent screen and an image signal S2 of the child screen from the D/A conversion unit 209 in accordance with a child screen position signal S9 output from the memory control unit 207.

211 is a multi-image signal output unit for outputting the multi-image signal S6 to the image compression unit 107.

Next, the configuration of the image compression unit 107 will be described with reference to a block diagram of FIG. 4. In FIG. 4, 301 is an input unit for introducing the multi-image signal S6 output from the image processing unit 106 into the inside of the unit.

302 is an input unit of a quantizing step control signal S4 for inputting the quantizing step control signal S4 output from the system control unit 108 to control the quantizing step in quantizing the image signal subjected to discrete cosine conversion.

303 is a switch signal input unit for inputting an in-frame/between-frame switch signal S5 output from the system control unit 108 to switch the processing of image signal to either in-frame or between-frame.

304 is an image signal subtraction unit for taking a difference between a current frame image signal S11 input from the image signal input unit 301 and a previous frame image signal S12 from the memory unit 311 when making the processing between frames.

305a and 305b are switch units for switching the image signal bus between in-frame and between-frame processings, in which the switching operation is controlled by an in-frame/between-frame switch signal S5.

306 is a DCT unit for outputting the conversion coefficient of each frequency provided for the image signal by reducing the spatial redundancy with the image signal through the discrete cosine conversion of the input image signal.

307 is a quantizing unit for quantizing data to restrict the data generation amount of frequency conversion coefficient output from the DCT unit 306, in which its quantizing step is controlled by a quantization step control signal S4 output from the system control unit 108.

308 is an inverse quantizing unit for restoring the frequency conversion coefficient of the image signal quantized in the quantizing unit 307, in which its quantizing step is controlled by a quantization step control signal S4 from the system control unit 108, like the quantizing unit 307.

309 is an IDCT unit for producing and outputting again an original image signal through the inverse discrete cosine conversion based on the frequency conversion coefficient of image signal restored in the inverse quantizing unit 308.

310 is an image addition unit for adding an image signal output from the IDCT unit 309 and a previous image signal output from the memory unit 311.

311 is a memory unit for storing an image signal S12 of a previous frame necessary for making a different of image signal between frames.

312 is a predicting circuit unit for predicting the behavior of an image signal between frames to suppress the difference data amount generated in taking a between-frame difference between an image signal S12 of a previous frame stored in the memory unit 311 and an image signal S11 of a current frame input from the image signal input unit 301.

313 is a low pass filter unit for removing the quantization noise of an image signal restored in the inverse quantizing unit 308 and the IDCT unit 309.

314 is a variable length coding (VLC) unit which is comprised of variable length coding means to reduce the data generation amount by allocating the value of less data amount to more appearing frequency coefficient of the image signal quantized and output from the quantizing unit 307.

315 is a compression data output unit for outputting compressed image signal to a signal multiplexing unit 111.

Next, the operation of photographing an animated image in the first image signal input device 101 and photographing a still image of e.g., an OHP sheet or a document in the second image signal input device 103, thereby transmitting these two image signals as a multi-image, will be described below with reference to the flowchart of FIG. 6.

First, at step P1, the settings for the animated image to be input from the first image signal input device 101, and for the still image to be input from the second image signal input device 103 are made. These settings are made for system control unit 108 by operating the operation panel unit 114.

Then, proceeding to step P2, an image signal of the second image signal input device 103 is selected as the image signal S2 for the child screen. This selection is made in such as way that the system control unit 108 turns a switch of the image switching unit 105 into the first terminal a side by operating the operation panel unit 114.

Thereby, in the image signal processing unit 106, an image signal input from the first image signal input device 101 is subjected to image processing as a parent screen, and an image signal input from the second image signal input device 103 is subjected to image processing as a child screen.

Then, proceeding to step P3, if the compression of the image signal is selected by an operation on the operation panel 114, the memory control unit 207 reads the image signal S2 for the child screen recorded in the field memory unit 208 with reference to a parent screen synchronization signal S7 divided from the image signal S1 of the parent screen by the synchronization dividing unit 205a, and based on a counter value set by the system control unit 108, in which the image signal S2 for the child screen is input via the D/A conversion unit 209 and the clamp unit 204c into the second terminal b side of the image switching unit 210.

The image switching unit 210 makes switching between an image signal S1 of the parent screen input into the first terminal a side and an image signal S2 of the child screen input into the second terminal b side in accordance with a child screen position signal S9 (as shown in FIG. 5) output from the memory control unit 207, in which when the signal level of the child screen position signal S9 is in the "H" level, the image signal of the child screen on the second terminal b side is output.

Also, when the signal level of the child screen position signal S9 is in the "L" level, the image signal for the parent screen on the first terminal a side is output to the image compression unit 107. Thereby, the image compression unit 107 conducts image compression of these multi-image signals.

Then, proceeding to step P4, the system control unit 108 detects the signal level of the child screen position signal S9 output from the memory control unit 207. And, when the signal of the child screen position signal S9 is in the "H" level, the program proceeds to step P6, where the parameter of quantizing step in the quantizing unit 307 is set to a value of shorter step interval.

Also, when the voltage level of the child screen position signal S9 is in the "L" level, the program proceeds to step P5, where the parameter of quantizing step in the quantizing unit 307 is set to a value of greater step interval. Thereby, the image signal of the child screen having a still image of fine character information taken is subjected to image compression with less distortion, when expanded.

On the other hand, the parent screen having an animated image taken is subjected to image compression with less data generation amount.

In the example 1 as above described, there is provided an image processing apparatus for compressing a multi-image composed of a plurality of images superimposed on the same screen to transmit the compressed multi-image via the line, wherein the coordinates information of a child screen area superimposed as a child screen on the same screen is detected to control the image compression ratio based on the coordinates information when the child screen area is compressed, so that the compression ratio of the child screen area can be different from the other screen areas, whereby it is possible to select the image compression ratio suitable for the image content of the respective child screen superimposed. Thereby, the image of the child screen is prevented from degrading extremely owing to image compression, and excellent image display can be made even when the still screen is displayed on the child screen.

Next, a second example will be described with reference to FIGS. 7 to 12.

Figure 7:
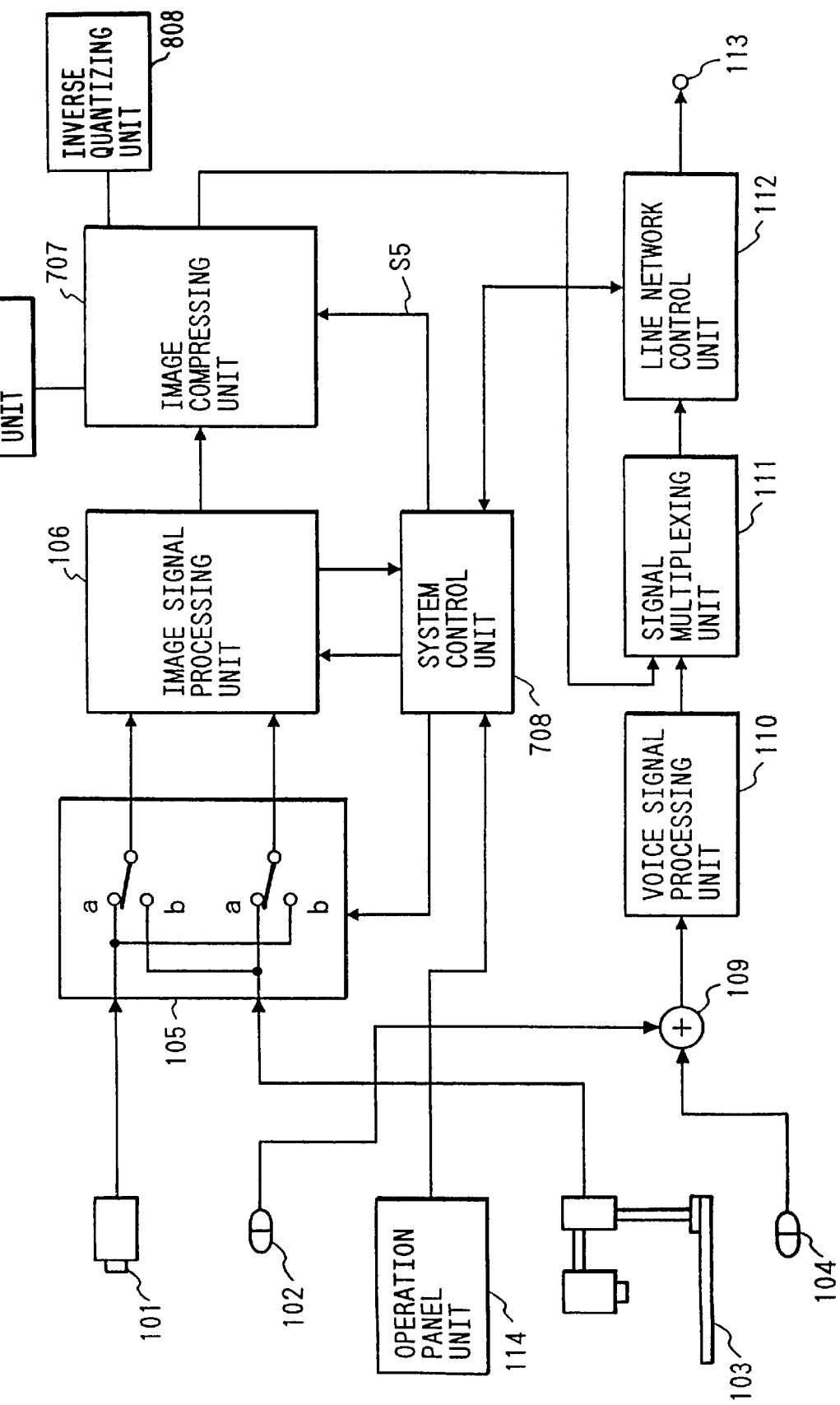
FIG. 7 is a system block diagram of an image processing apparatus according to a second embodiment of the present invention.
Figure 8:
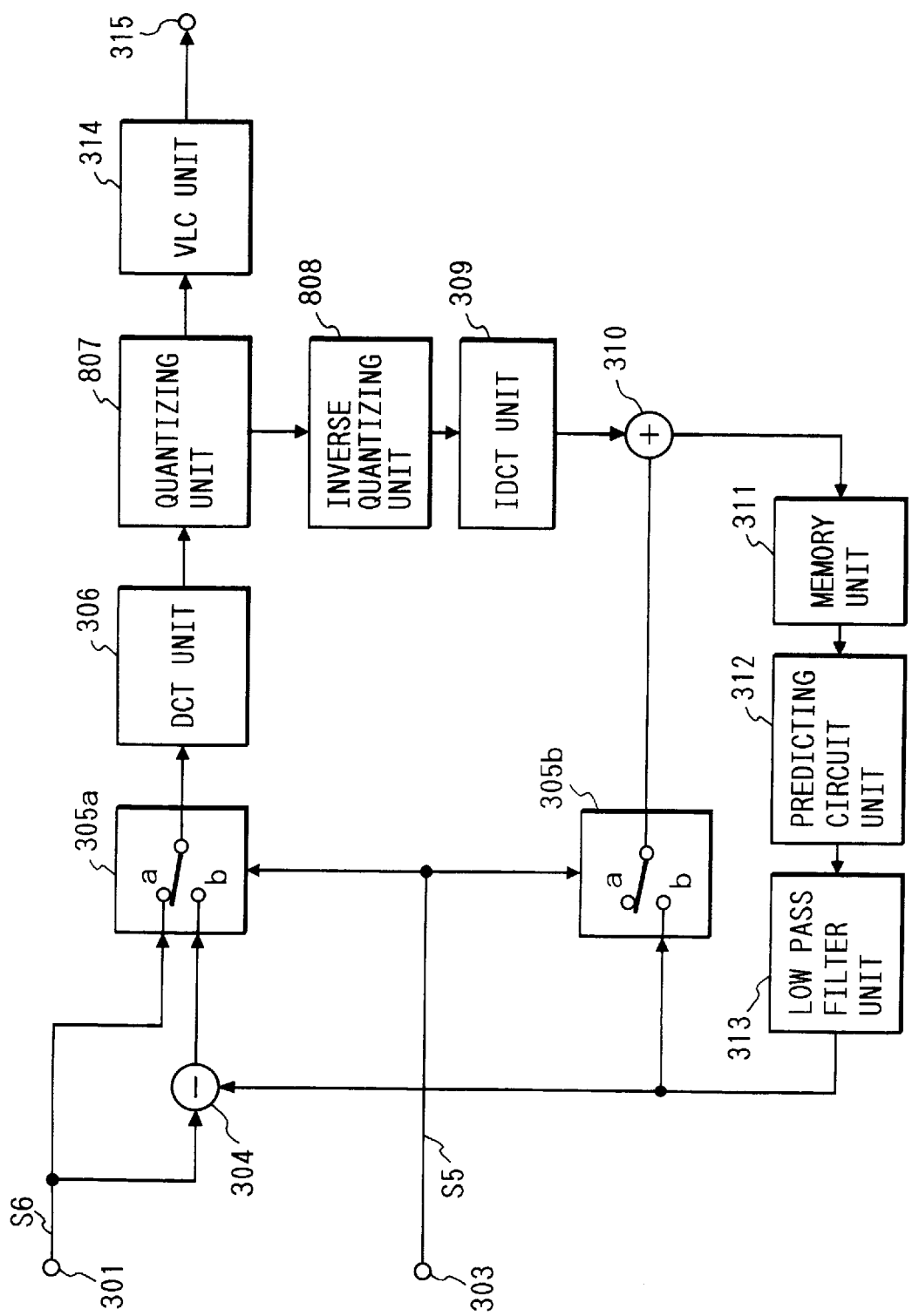
FIG. 8 is a block diagram showing the configuration of an image compression unit 707 as shown in FIG. 7.
Figure 9:
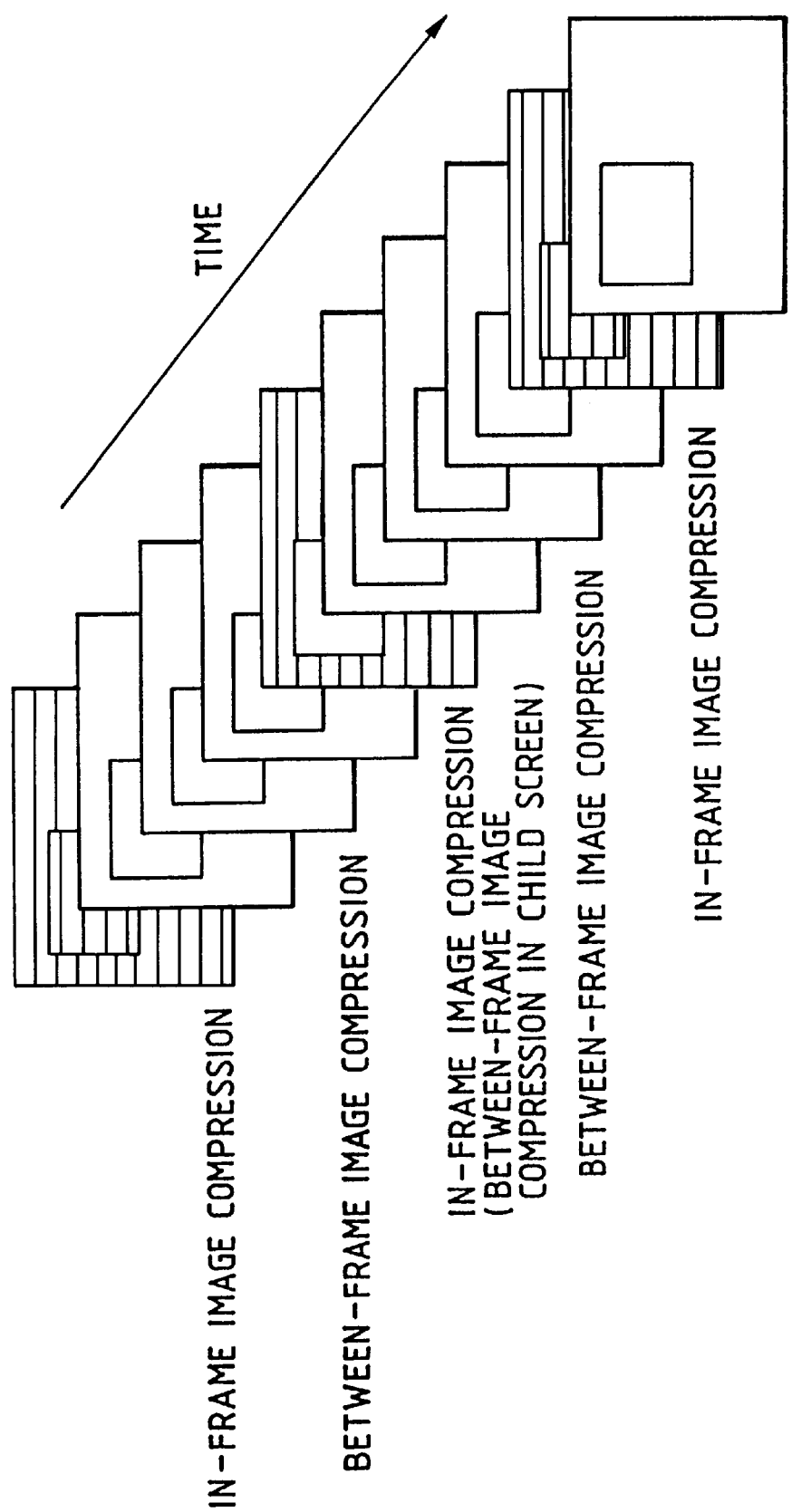
FIG. 9 is a sequence diagram showing an in-frame and between-frame image compression sequence according to the second embodiment.
Figure 10:
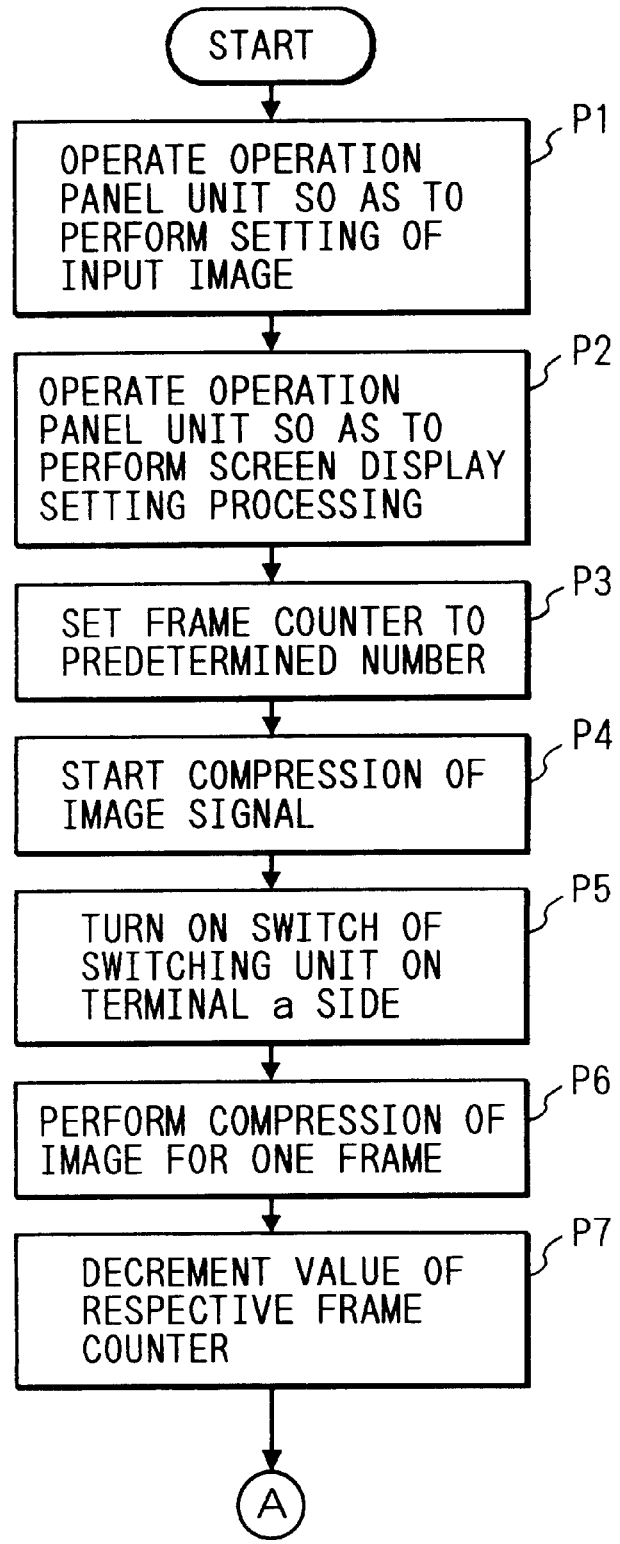
FIG. 10 is a flowchart showing the image compression operation sequence of the image processing apparatus according to the second embodiment.
Figure 11:
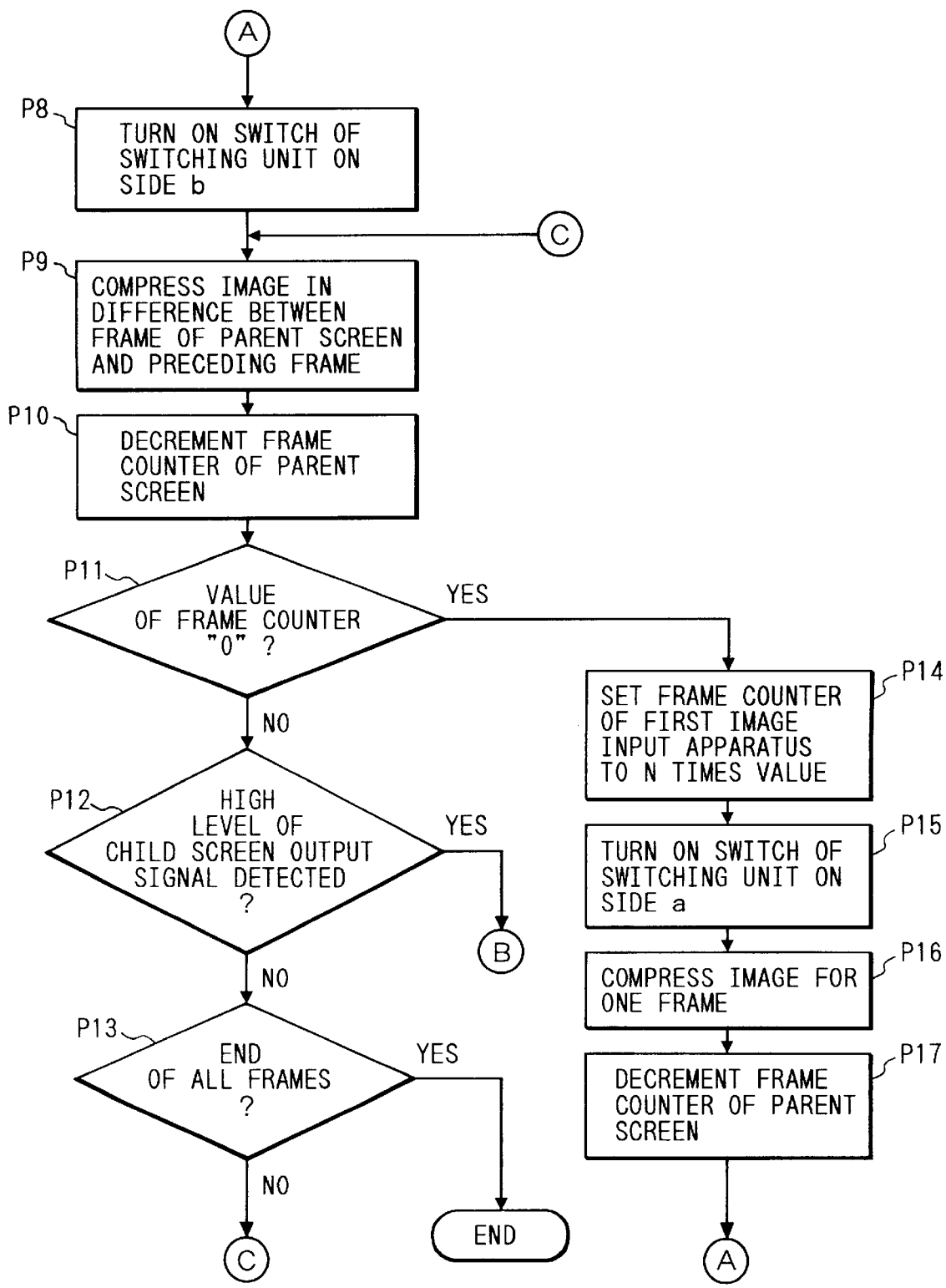
FIG. 11 is a flowchart showing the image compression operation sequence of the image processing apparatus according to the second embodiment.
Figure 12:
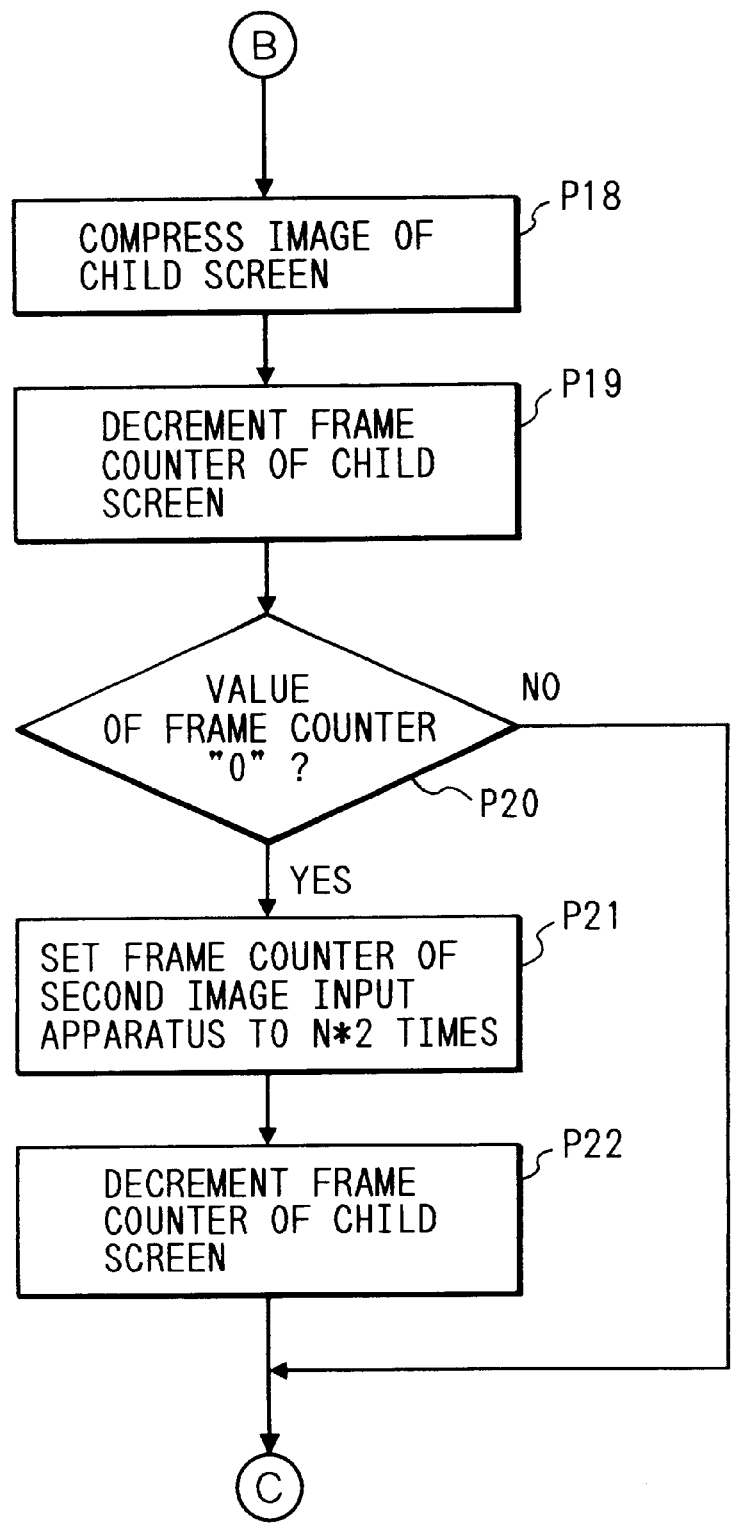
FIG. 12 is a flowchart showing the image compression operation sequence of the image processing apparatus according to the second embodiment.
Figure 13:
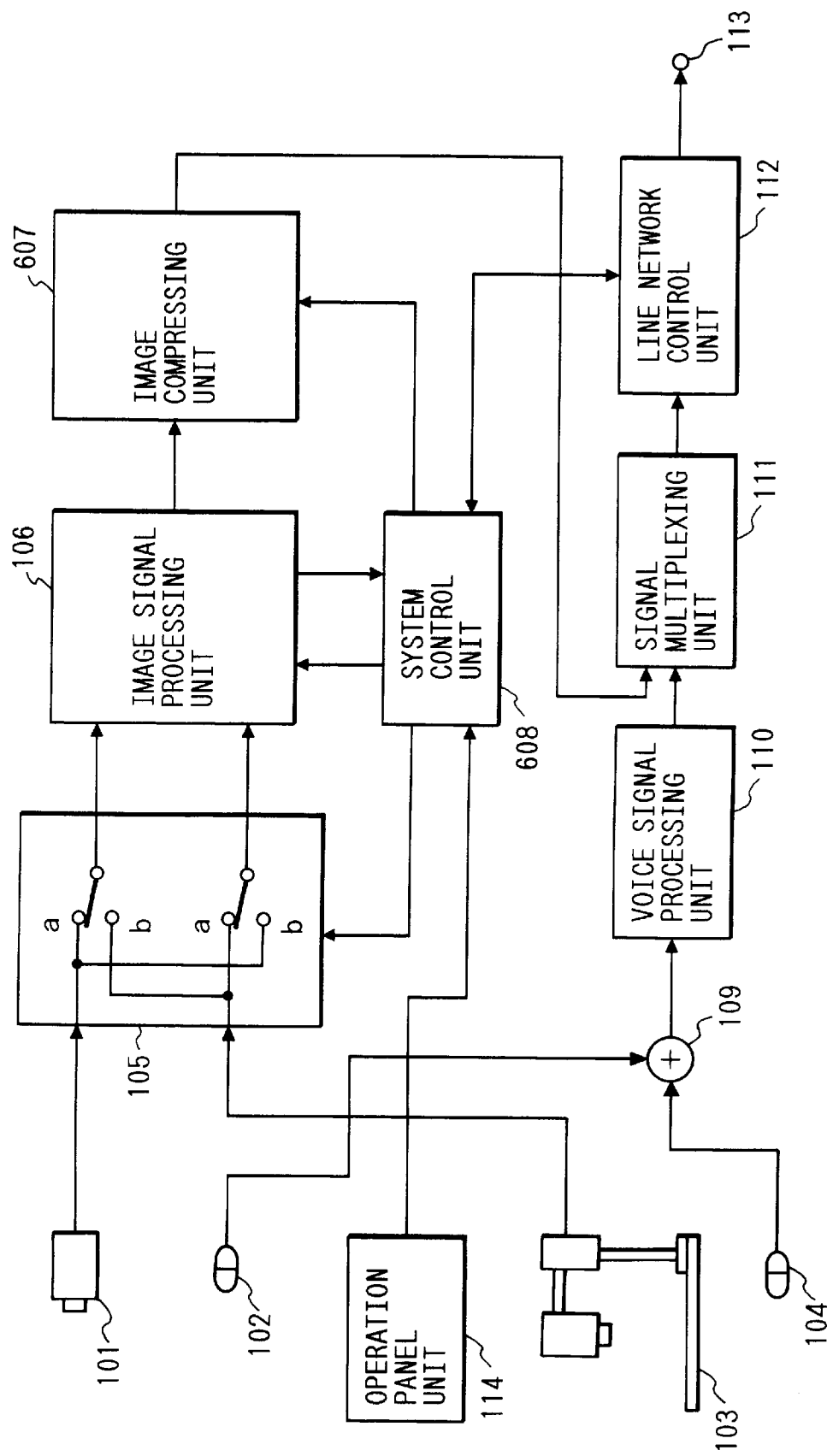
FIG. 13 is a system block diagram showing one example of the conventional image processing apparatus.

FIG. 7 is a system block diagram best representing an image processing apparatus of the second example. Also, FIG. 8 is a functional block diagram showing the configuration of an image compression unit 707 as shown in FIG. 7. Further, FIG. 9 is a sequence chart showing an image compression sequence of in-frame and between-frame in the second example, and FIGS. 10 to 12 are flowcharts showing an image compression operation sequence of the image processing apparatus in this second example.

In FIG. 7, 707 is an image compression unit for reducing the data amount of the image signal by removing a redundant signal component contained in an image signal output from the image processing unit 106. This image compression unit 707 is comprised of a discrete cosine conversion circuit, a between-frame comparison circuit, and a quantizing circuit, which can change the parameter for quantization by an in-frame/between-frame switching signal S5 supplied from the system control unit 708.

Also, 708 is a system control unit. This system control unit 708 is provided to control the overall operation of the image processing apparatus in the conventional example, and comprised of a microcomputer having a CPU, a ROM and a RAM.

In FIG. 8, 807 is a quantizing unit for quantizing the frequency conversion coefficient output from a DCT unit 306 to restrict the data generation amount.

Also, 808 is an inverse quantizing unit for restoring the frequency conversion coefficient quantized in the quantizing unit 807 provided at the previous stage.

With such a configuration, a first image signal input device 101 photographs an animated image and a second image signal input device 103 photographs a still image such as an OHP sheet or a document. And the operation of transmitting these two image signals as a multi-image will be described based on the flowchart of FIGS. 10 to 12.

First, at step P1, the setting of input image is performed. This image setting is made to the system control unit 708 by operating the operation panel unit 114, such that an animated image is input from the first image signal input device 101 and a still image is input from the second image signal input device 103 in this example 2.

Then, at step P2, the setting of displaying the child screen is performed. This setting is made by inputting, from the operation panel 114, a selection of an image signal of the second image signal input device 103 as an image signal S2 for the child screen, in which if this setting is made, the system control unit 708 turns a switch of the image switching unit 105 into the first terminal a side.

Also, in the image signal processing unit 106, an image signal from the first image signal input device 101 is subjected to image processing as a parent screen, and an image signal of the second image signal input device 103 is subjected to image processing as a child screen.

Then, proceeding to step P3, a frame counter is set to a predetermined number. This number setting is performed by the system control unit 708 prior to compression of the animated image, in which the frame counter value for the first image signal input device 101 is set to N to count the frame number which is a period of switching the compression between in-frame and between-frame.

Also, the frame counter value for the second image signal input device 103 into which the still image is input is set to a value equal to twice N.

Then, at step P4, the compression of image is started, and then the program proceeds to step P5. At step P5, the switching units 305a and 305b in the image compression unit 707 are turned into the first terminal a side by an in-frame/between-frame switching signal output from the system control unit 708.

Then, at step P6, the image compression unit 707 starts the compression of in-frame image. And if one frame of image has been compressed, the program proceeds to step P7, where the system control unit 708 decrements by one the respective frame counter values.

Then, at step P8, the image compression in the image compression unit 707 is switched to the between-frame image compression by turning the switching units 305a and 305b into the second terminal b side by an in-frame/between-frame switching signal S5.

In this way, by switching to the between-frame image compression, at step P9, the image compression unit 707 performs image compression of an image difference between a parent screen signal S11 of a current frame output from the image processing unit 106 and a parent screen signal S12 of a previous frame recorded in the memory unit 311 of the image compression unit 707.

Then, at step P10, the system control unit 708 decrements by one the frame counter value of parent screen if one frame is subjected to the between-frame compression. Thereafter, at step P11, the frame counter value is checked to be equal to 0 or not.

As a result of determination, if the frame counter value is 0, the program proceeds to step P14, where the frame counter value of the first image signal input device 101 which outputs the parent screen signal is reset to N to perform the in-frame image compression. And at next step P15, the switching units 305a and 305b of the image compression unit 707 are turned into the first terminal a side by an in-frame/between-frame switching signal.

Then, at step P16, the in-frame image compression is made for one frame to generate an image frame again which is a reference. And at the next step P17, the reset frame counter of parent screen reset is decremented by one.

On the other hand, as a result of determination at step P111, when the frame counter value of the parent screen is not 0, the program proceeds to step P12, where the system control unit 708 monitors the output level of the child screen position signal S9 output from the image signal processing unit 106. And when it is in the "H" level, the program proceeds to step P18, where the child image output from the image signal processing unit 106 is subjected to image compression, and then at step P19, the frame counter value of the child screen is decremented by one.

Then, at step P20, the frame counter value is checked to be equal to 0 or not, in which if the frame counter value is 0, the program proceeds to step P21, where the frame counter of the second image signal input device 103 which outputs the child screen signal is reset to a value equal to twice N. Thereafter, at next step P22, its value is further decremented by one.

On the other hand, as a result of determination at step P12, if the high level of the child screen output signal is not detected, the program proceeds to step P13, where the system control unit 708 checks to determine whether or not image compression of all the image frames have been completed. And if completed, the program is ended, but if any image frame to be subjected to image compression still remains, the program returns to step P9 to repeat the previously-described between-frame image compression.

In this way, if the switching frequency of in-frame/between-frame image compression is made different in making image compression, depending on the image content of the parent screen and the child screen, it is possible to reduce the data amount of image transmission by raising the frequency of between-frame image compression having higher image compression ratio for the child image signal with less motion.

THIRD EXAMPLE

A third example is intended to prevent the image degradation and a rapid increase of image information by making in-frame compression, when the correlation of image between a previous frame and a current frame is weak, such as when the position of the child screen is changed in the superimposed image, when the parent screen and the child screen are switched, or when the display/non-display of the child screen is switched.

Figure 14:
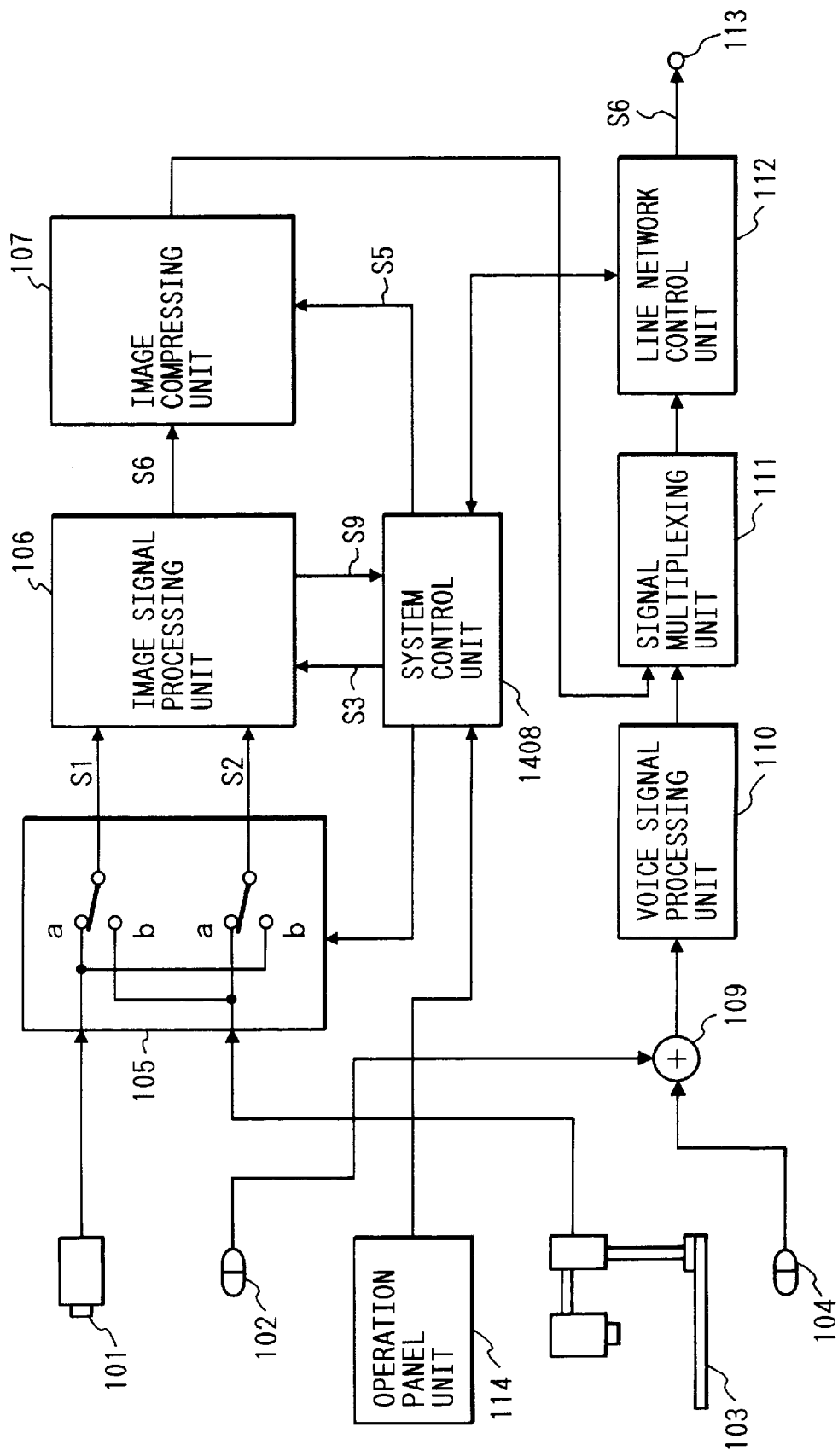
FIG. 14 is a system block diagram showing one example of the conventional image processing apparatus.

This example can be implemented with the configuration of FIG. 14, a different point from FIG. 2 is that the system control unit 1408 detects a change in the display of the child screen caused by an instruction of the operation panel 114.

Other points than above described are identical to those of the configuration of FIGS. 7 and 8, and the explanation thereof is omitted.

Figure 15:
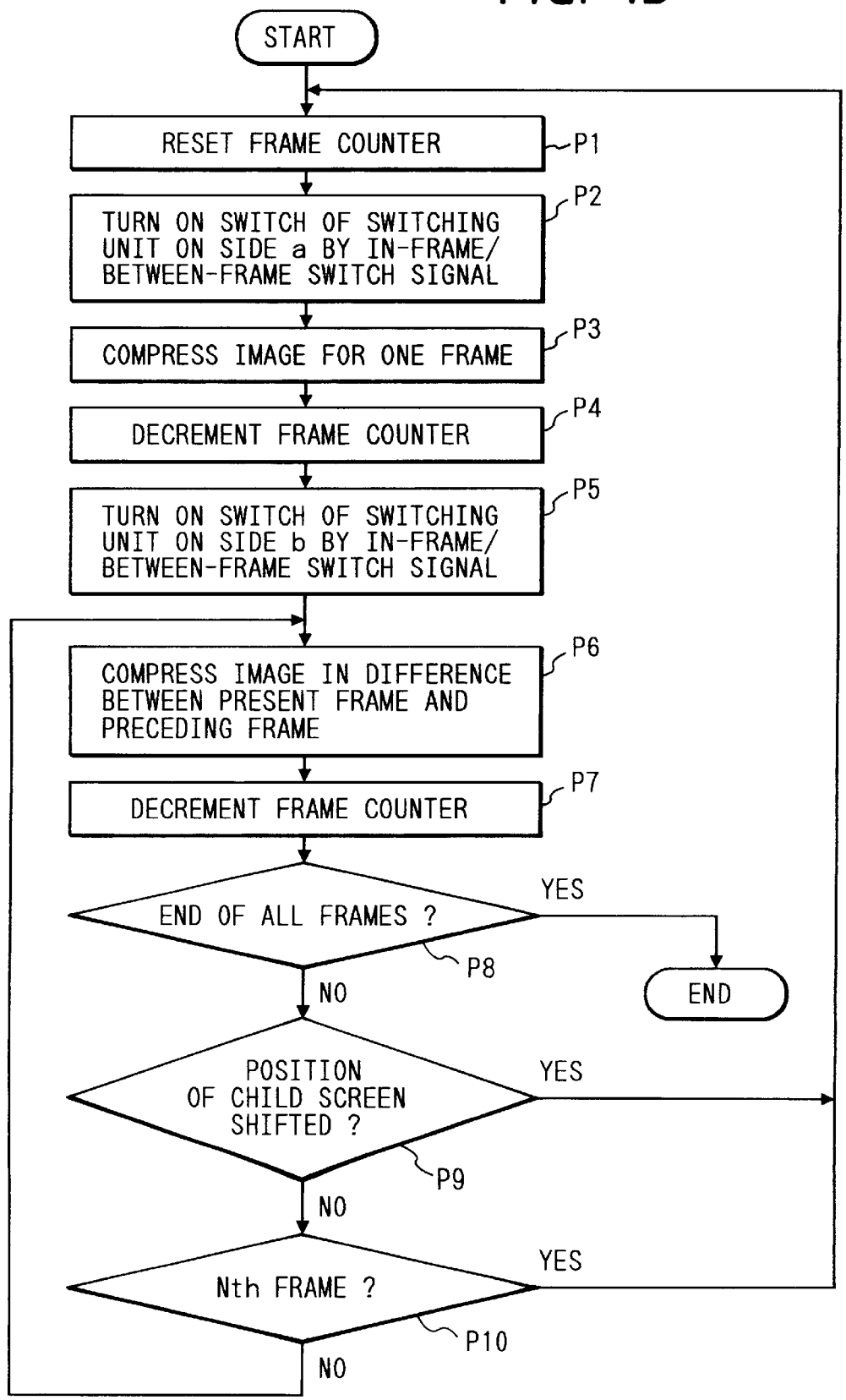
FIG. 15 is a flowchart showing the image compression operation sequence of an image processing apparatus according to a third embodiment of the present invention.

Next, the animated image compression operation of the third example will be described with reference to FIG. 7 and a flowchart of FIG. 15.

First, at step P1, the system control unit 1408 resets the frame counter value provided to count the number of animated image frames to a predetermined value N12, prior to compression of animated image.

Then, at step P2, the compression mode of an image compression unit 107 is changed to an in-frame compression mode by turning the switching units 305a and 305b of the image compression unit 107 into the first terminal a side by an in-frame/between-frame switching signal.

Then, at step P3, the system control unit 1408 monitors a synchronization signal for the multi-image signal output from an image signal processing unit 106, so that a multi-image signal of one frame is input into the image compression unit 107 for the in-frame image compression. Thereafter, at step P4, the counter value of the frame counter is incremented by one.

Then, at step P5, the compression mode of an image compression unit 107 is changed to an between-frame compression mode by turning the switching units 305a and 305b of the image compression unit 107 into the second terminal b side by an in-frame/between-frame switching signal.

In this way, by switching to the between-frame compression mode, at step P6, the image compression unit 107 compresses the image difference between the current frame of multi-image signal output from the image processing unit 106 and the previous frame recorded in the frame memory 311 of the image compression unit 107.

At next step P7, the system control unit 508 decrements the frame count value by one if one frame is subjected to between-frame compression, and at step P8, a check is made to determine whether or not all the frames of the multi-image signal to be subjected to image compression are completed.

As a result of determination at step P8, if all the frames have been compressed, the image compression operation is ended. Or if not, the program proceeds to step P9, where a check is made to determine whether or not the position change of the child screen is input from the operation panel 114, and if the position change has been input, a new child screen position control signal is output to the image signal processing unit 106 to shift the display position of the child screen.

Thereby, since a multi-image signal having weak image correlation with the previous frame is input to the image compression unit 107, the program returns to step P1 to make in-frame compression mode to produce an image frame as the reference again.

Also, as a result of determination step P9, when the position change of the child screen is not input, the program proceeds to step P10, where a check is made to determine whether or not the frame number (preset) currently in image compression is at the N-th frame by referring to the value of the frame counter.

As a result of determination at step P10, if the frame number is at the N-th frame, the program returns to step P1 to prevent degradation of image signal due to between-frame compression, where the in-frame compression of multi-image signal is performed. Or if not, the program returns to step P6 to repeat the between-frame compression.

In this way, if the display position of the child screen superimposed on the multi-image is changed during the image compression in the between-frame compression mode, it is possible to prevent degradation in the image compression by changing the image compression mode into the in-frame compression mode from the frame at which the screen display position is changed.

While the third example was described with the changing of the of display position of child screen as an example of the changing the display mode of child screen area for the multi-image, it will be appreciated that other examples are also possible with the same effects, in which the parent screen and the child screen are switched by the switching of the image signal switching unit 105 in accordance with an instruction on the operation panel unit 114, the display and the non-display of the child screen are switched when the output of child screen position control signal S3 is stopped or changed in accordance with an instruction on the operation panel unit 114, or the image compression mode is switched in accordance with a change in the size of child screen.

In the third example as above described, there is provided an image processing apparatus for compressing a multi-image composed of a plurality of images superimposed on the same screen to transmit the compressed multi-image via a line, comprising multi-image synthesizing means for superimposing at least one image signal or more of a plurality of image signals input via image signal input means, as a child screen on the same screen, display mode changing means for changing a display mode of the child screen area superimposed by the multi-image synthesizing means, and image compression means having at least two image compression modes or more, wherein if the display position of the child screen superimposed on the multi-image is changed while the image compression means is compressing the multi-image in the between-frame compression mode, it is possible to prevent the degradation of image compression by switching the image compression mode into the in-frame compression mode again from the frame at which the screen display position is changed, resulting in image compression having less degraded image quality even when the child screen display mode of the multi-image is changed.

In the first, second, and third examples as above described, the compressed image is output to the remote terminal equipment which is an external apparatus, but the present invention is not limited thereto, and it will be apparent that the output destination may be a storage device (HD, optical disk, etc.).

The present invention is not limited to the above-described examples, but various applications can be made within the scope of the claims.

What is claimed is:

1. An image processing apparatus comprising:
   image input means for inputting at least two kinds of images;
   synthesizing means for synthesizing the images input by said image input means so as to be an image of one screen;
   compression means for compressing the image synthesized by said synthesizing means;
   control means for controlling the compression ratio of said compression means in accordance with the kind of image; and
   output means for outputting the image of one screen obtained by synthesizing said at least two kinds of images after the compression by said compression means.

2. An image processing apparatus according to claim 1, wherein the two kinds of images are a moving image and a still image.

3. An image processing apparatus according to claim 2, wherein the control means compresses said moving image at a higher compression ratio than the still image.

4. An image processing apparatus according to claim 1, wherein the compression ratio is controlled by changing a quantizing step.

5. An image processing apparatus according to claim 1, wherein said control means changes the compression ratio in accordance with the synthesizing position of the two kinds of images by said synthesizing means.

6. An image processing apparatus according to claim 1, wherein said synthesizing means makes one of the two kinds of images an image of a child screen with respect to the other image.

7. An image processing apparatus comprising:
   image input means for inputting at least two kinds of images;
   synthesizing means for synthesizing the images input by said image input means so as to be an image of one screen;
   compression means for compressing an image synthesized by said synthesizing means using two types of compression methods including a between-frame compression and an in-frame compression;

control means for controlling a switching period of the compression method in accordance with the kind of image within the synthesized image; and output means for outputting the image of one screen obtained by synthesizing said at least two kinds of images after the compression by said compression means.

8. An image processing apparatus according to claim 7, wherein the two kinds of images are an animated image and a still image.

9. An image processing apparatus according to claim 8, wherein said control means controls the switching period of the compression method from the between-frame compression to the in-frame compression to be longer in a still image region in an animated image region in the synthesized image.

10. An image processing apparatus according to claim 7, wherein said synthesizing means makes one of the two kinds of images an image of a child screen with respect to the other image.

11. An image processing apparatus comprising:

image input means for inputting at least two kinds of images;

synthesizing means for synthesizing the images input by said image input means so as to be an image of one screen;

compression means for compressing an image synthesized by said synthesizing means using two types of compression methods including a between-frame compression and an in-frame compression;

change-means for changing the synthesized state of the at least two kinds of images to be synthesized by said synthesizing means based on a manual instruction of an operator; and setting means for setting the compression method in accordance with an instruction of said change means.

12. An image processing apparatus according to claim 11, wherein said setting means sets the in-frame compression in accordance with a change from said change means.

13. An image processing apparatus according to claim 11, wherein said change means changes that a synthesized position of an image input by said image input means is in a synthesize state.

14. An image processing apparatus according to claim 11, wherein said change means changes either the synthesis or a suspended synthesis to be the synthesized state.

15. An image processing apparatus according to claim 11, wherein said synthesizing means makes one of the two kinds of images an image of a child screen with respect to the other image.

16. An image processing apparatus according to claim 15, wherein said change means changes which of the two kinds of images is made a child screen as the synthesized state.

17. An image processing method comprising the steps of:
inputting at least two kinds of images;
synthesizing the input images so as to be an image of one screen;
compressing an image synthesized by said synthesizing step;
controlling the compression ratio at said compression step in accordance with the kind of image; and
outputting the image of one screen obtained by synthesizing the at least two kinds of images after compressing the synthesized image.

18. An image processing method according to claim 17, wherein the two kinds of images are a moving image and a still image.

19. An image processing method according to claim 18, wherein said control step includes compressing the moving image at a higher compression ratio than the still image.

20. An image processing method according to claim 17, wherein the compression ratio is controlled by changing a quantizing step.

21. An image processing method according to claim 17, wherein said control step includes changing the compression ratio in accordance with the synthesizing position of the two kinds of images by said synthesizing step.

22. An image processing method according to claim 17, wherein the synthesizing step makes one of said two kinds of images an image a child screen with respect to the other image.

23. an image processing method comprising the steps of:
inputting at least two kinds of images;
synthesizing the input images so as to be an image of one screen;
compressing an image synthesized by said synthesizing step using two types of compression methods including a between-frame compression and an in-frame compression;
controlling the switching period of said compression method in accordance with the kind of image within the synthesized image; and
outputting the image of one screen obtained by synthesizing the at least two kinds of images after compressing the synthesized image.

24. An image processing method according to claim 23, wherein the two kinds of images are an animated image and a still image.

25. An image processing method according to claim 24, wherein said control step includes controlling a switching period of the compression method from the between-frame compression to the in-frame compression to be longer in a still image region than in an animated image region in the synthesized image.

26. An image processing apparatus according to claim 23, wherein said synthesizing step makes one of the two kinds of images an image of a child screen with respect to the other image.

27. An image processing method comprising the steps of:
inputting at least two kinds of images;
synthesizing the input images so as to be an image of one screen;
compressing an image synthesized at said synthesizing step using two types of compression methods including a between-frame compression and an in-frame compression;
changing the synthesized state of the at least two kinds of images to be synthesized based on a manual instruction of an operator; and
setting the compression method in accordance with an instruction of said changing step.

28. An image processing method according to claim 27, wherein said setting step includes setting the in-frame compression in accordance with a change of said change step.

29. An image processing method according to claim 27, wherein said change step includes changing that a synthesized position of an image input at said image input step is in a synthesize state.

30. An image processing method according to claim 27, wherein said change step includes changing either the synthesis or suspended synthesis to be the synthesized state.

31. An image processing method according to claim 27, wherein said synthesizing step includes making one of the two kinds of images an image of child screen with respect to the other image.

32. An image processing method according to claim 31, wherein said change step changing which of the two kinds of images is made a child screen as the synthesized state.

33. An image processing apparatus comprising:
 first image input means for inputting a first frame image;
 second image input means for inputting a second frame image;
 synthesizing means for synthesizing the frame images input by said first and second image input means so as to be an image of one screen;
 compression means for compressing the image synthesized by said synthesizing means;
 control means for controlling the compression ratio of said compression means in accordance with a change point of the first frame image and the second frame image in the synthesized image; and
 output means for outputting the image of one screen obtained by synthesizing the first and second frame images after the compression by said compression means.

34. An image processing apparatus according to claim 33, wherein the two kinds of images are a moving image and a still image.

35. An image processing apparatus according to claim 34, wherein said control means compresses the moving image at a higher compression ratio than the still image.

36. An image processing apparatus according to claim 33, wherein the compression ratio is controlled by changing a quantizing step.

37. An image processing apparatus according to claim 33, wherein said control means changes the compression ratio in accordance with the synthesizing position of the two frame images by said synthesizing means.

38. An image processing apparatus according to claim 33, wherein said synthesizing means makes one of the two frame images an image of a child screen with respect to the other frame image.

39. An image processing apparatus comprising:
 first image input means for inputting a first frame image;
 second image input means for inputting a second frame image;
 synthesizing means for synthesizing the frame images input by said first and second image input means so as to be an image of one screen;
 compression means for compressing the image synthesized by said synthesizing means using two types of compression methods including a between-frame compression and an in-frame compression;
 control means for controlling a switching period of the compression method in accordance with a change point of the first frame image and the second frame image in the synthesized image; and
 output means for outputting the image of one screen obtained by synthesizing the first and second frame images after the compression by said compression means.

40. An image processing apparatus according to claim 39, wherein the two frame images are an animated image and a still image.

41. An image processing apparatus according to claim 40, wherein said control means controls the switching period of the compression method from the between-frame compression to the in-frame compression to be longer in a still image region than in an animated image region in the synthesized image.

42. An image processing apparatus according to claim 39, wherein said synthesizing means makes one of the two frame images an image of a child screen with respect to the other frame image.

43. An image processing apparatus comprising:
 first image input means for inputting a first frame image;
 second image input means for inputting a second frame image;
 synthesizing means for synthesizing the frame images input by said first and second image input means so as to be an image of one screen;
 compression means for compressing an image synthesized by said synthesizing means using two types of compression methods including a between-frame compression and an in-frame compression;
 change means for changing the synthesized state of the frame images to be synthesized by said synthesizing means based on a manual instruction of an operator; and
 setting means for setting the compression method in accordance with an instruction of said change means.

44. An image processing apparatus according to claim 43, wherein said setting means sets the in-frame compression in accordance with an instruction from said instruction means.

45. An image processing apparatus according to claim 43, wherein said instruction means instructs a synthesized position of a frame image input by said first and second image input means to be in a synthesized state.

46. An image processing apparatus according to claim 43, wherein said instruction means instructs either the synthesis or a suspended synthesis to be the synthesized state.

47. An image processing apparatus according to claim 43, wherein said synthesizing means makes one of the two frame images an image of a child screen with respect to the other frame image.

48. An image processing apparatus according to claim 47, wherein said instruction means instructs which of the frame images is made a child screen as the synthesized state.

49. An image processing method comprising the steps of:
 inputting a first frame image;
 inputting a second frame image;
 synthesizing the input frame images so as to be an image of one screen;
 compressing the image synthesized by said synthesizing step;
 controlling the compression ratio at said compression step in accordance with a change point of the first frame image and the second frame image in the synthesized image; and
 outputting the image of one screen obtained by synthesizing the frame images after compressing the synthesized image.

50. An image processing method according to claim 49, wherein the two frame images are a moving image and a still image.

51. An image processing method according to claim 50, wherein said control step includes compressing the moving image at a higher compression ratio than the still image.

52. An image processing method according to claim 49, wherein the compression ratio is controlled by changing a quantizing step.

53. An image processing method according to claim 49, wherein said control step includes changing the compression ratio in accordance with the synthesizing position of the two frame images by said synthesizing step.

54. An image processing method according to claim 49, wherein said synthesizing step makes one of the two frame images an image of a child screen with respect to the other frame image.

55. An image processing method comprising the steps of:

inputting a first frame image;

inputting a second frame image;

synthesizing the input frame images so as to be an image of one screen;

compressing the image synthesized in said synthesizing step using two types of compression methods including a between-frame compression and an in-frame compression;

controlling the switching period of said compression method in accordance with a change point of the first frame image and the second frame image in the synthesized image; and outputting the image of one screen obtained by synthesizing the first and second frame images after compressing the synthesized image.

56. An image processing method according to claim 55, wherein the two frame images are an animated image and a still image.

57. An image processing method according to claim 56, wherein said control step includes controlling a switching period of the compression method from the between-frame compression to the in-frame compression to be longer in a still image region than in an animated image region in the synthesized image.

58. An image processing apparatus according to claim 55, wherein said synthesizing step makes one of the two frame images an image of a child screen with respect to the other frame image.

59. An image processing method comprising the steps of:

inputting a first frame image;

inputting a second frame image;

synthesizing the input first and second frame images so as to be an image of one screen;

compressing an image synthesized at said synthesizing step using two types of compression methods including a between-frame compression and an in-frame compression;

changing the synthesized state of the two frame images to be synthesized based on a manual instruction of an operator; and setting the compression method in accordance with an instruction of said change step.

60. An image processing method according to claim 59, wherein said setting step includes setting the in-frame compression in accordance with an instruction of said instruction step.

61. An image processing method according to claim 59, wherein said instruction step includes instructing a synthesized position of an image input at said image input step to be in a synthesized state.

62. An image processing method according to claim 59, wherein said instruction step includes instructing either the synthesis or suspended synthesis to be the synthesized state.

63. An image processing method according to claim 59, wherein said synthesizing step includes making one of the two frame images an image of a child screen with respect to the other image.

64. An image processing method according to claim 63, wherein said instruction step instructs which of the two frame images is made a child screen as the synthesized state.

* * * * *

UNITED STATES PATENT AND TRADEMARK OFFICE
CERTIFICATE OF CORRECTION

PATENT NO. : 5,929,930

DATED : July 27, 1999

INVENTOR(S): KUNIAKI KUROKAWA

It is certified that error appears in the above-identified patent and that said Letters Patent is hereby corrected as shown below:

ON THE TITLE PAGE:
Item [56] References;

Insert:
FOREIGN PATENT DOCUMENTS, "0173592  8/1985  Japan" should read --0173592  8/1986  Japan--.

COLUMN 9:

Line 59, "P111," should read --P11,--.

COLUMN 13:

Line 14, "region" should read --region than--.
Line 30, "change-means" should read --change means--.
Line 42, "synthesize" should read --synthesized--.

COLUMN 14:

Line 13, "an image" should read --an image of--.
Line 62, "synthesize" should read --synthesized--.

UNITED STATES PATENT AND TRADEMARK OFFICE
CERTIFICATE OF CORRECTION

PATENT NO. : 5,929,930

DATED : July 27, 1999

INVENTOR(S): KUNIAKI KUROKAWA

It is certified that error appears in the above-identified patent and that said Letters Patent is hereby corrected as shown below:

COLUMN 15:

Line 1, "of child" should read --of a child--.
Line 4, "changing" should read --changes--.
Line 5, "as" should read --is in--.

Signed and Sealed this

Eighth Day of August, 2000

Attest:

Q. TODD DICKINSON

Attesting Officer     Director of Patents and Trademarks